Sept. 16, 1924.

E. BREITLING 1,508,953

COUPLING DEVICE FOR CASH REGISTERS, CALCULATING MACHINES, OR THE LIKE

Filed Dec. 29, 1921   3 Sheets-Sheet 1

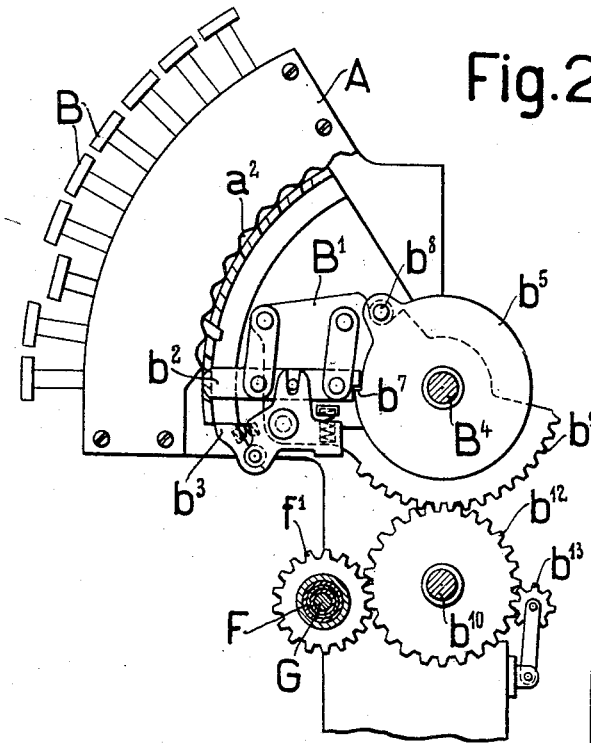

Sept. 16, 1924.  
E. BREITLING  
1,508,953

COUPLING DEVICE FOR CASH REGISTERS, CALCULATING MACHINES, OR THE LIKE

Filed Dec. 29, 1921  3 Sheets-Sheet 3

Inventor:
Ernst Breitling
By Knight Bros
attys

Patented Sept. 16, 1924.

1,508,953

UNITED STATES PATENT OFFICE.

ERNST BREITLING, OF ESSEN, GERMANY, ASSIGNOR TO FRIED. KRUPP AKTIEN-GESELLSCHAFT, OF ESSEN-ON-THE-RUHR, GERMANY.

COUPLING DEVICE FOR CASH REGISTERS, CALCULATING MACHINES, OR THE LIKE.

Application filed December 29, 1921. Serial No. 525,768.

*To all whom it may concern:*

Be it known that I, ERNST BREITLING, residing at Essen, Germany, a citizen of the German Republic, have invented a certain new and useful Improvement in Coupling Devices for Cash Registers, Calculating Machines, or the like, of which the following is a specification.

This invention relates to an apparatus for cash registers or calculating machines for selectively coupling one of a number of registering mechanisms, f. i. totalizing counters to operating members controlled by the setting mechanism of the machine. The object of the invention is to provide an apparatus of this kind which, f. i. in the case of cash registers which have the totalizing counters arranged in a drum, enables any totalizing counter to be selected and brought into engagement with the operating members without any rotation of the drum.

This object is realized by the fact that each registering mechanism carrier can have imparted to it the movement, required to connect and disconnect the registering mechanism to and from the operating members, by a gearing member cooperating with a setting pin of the respective registering mechanism carrier, said gearing member, when the machine is operated, making a movement setting it to the setting pin of one of the registering mechanisms, and a second movement directed transversely to said setting movement.

The invention will be described with reference to an embodiment of the subject-matter of the invention shown by way of example in the accompanying drawing, in which, Fig. 1 is a front elevation of a cash register with the drum in longitudinal section, certain parts being omitted for the sake of clearness.

Fig. 2 is a section on the line 2—2 of Fig. 1.

Fig. 3 is a cross section of the drum on the line 3—3 of Fig. 1.

Fig. 4 is a section on the line 4—4 of Fig. 1.

Furthermore and on a slightly larger scale

Figure 9:
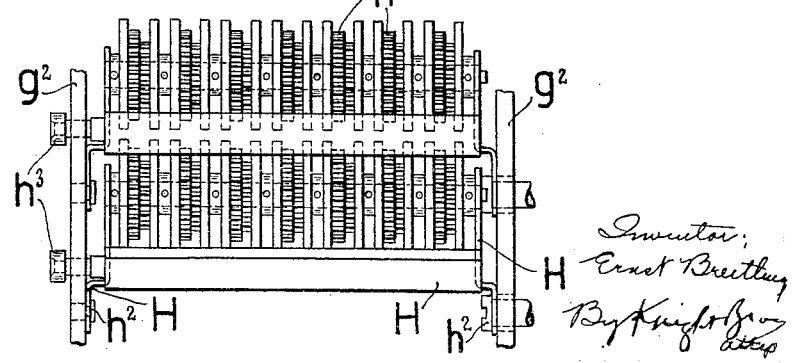

Fig. 9 is rear view of a portion of the drum.

Figure 1:
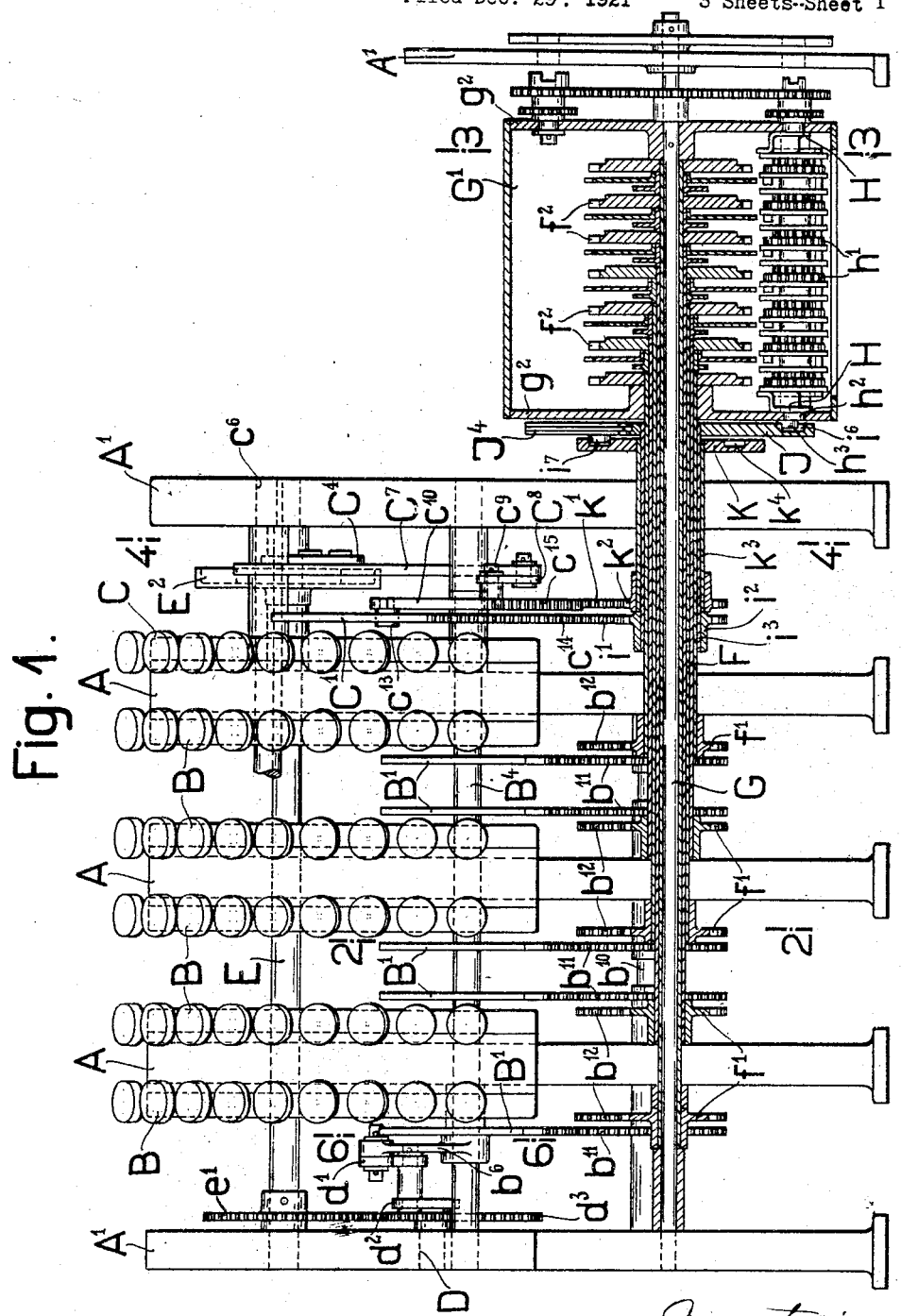

In the keybanks A are mounted five rows of amount keys B (see Figures 1 and 2) and one row of special keys C (see Figures 1 and 4). The amount keys B cooperate with feelers $b^3$ of setting bolts $b^2$ pivoted to driving sectors $B^1$ and the special keys C provided for the selection of the totalizing counters cooperate with a feeler $c^3$ of a setting bolt $c^2$ pivoted to a driving sector $C^1$. The driving sectors $B^1$, which are mounted to rotate loosely on a shaft $B^4$, are adjusted by means of driver discs $b^5$, which are rigidly connected to this shaft and to which a rocking movement is imparted by a crank gear when the cash register is operated.

Figure 6:
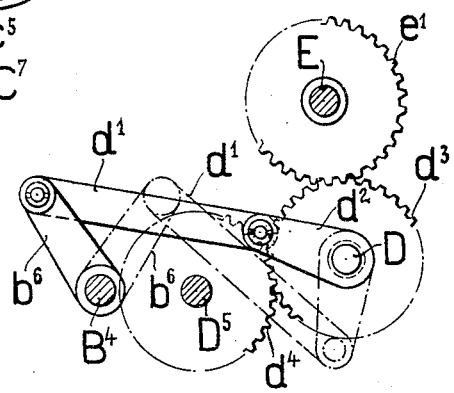
Fig. 6 is a section on the line 6—6 of Fig. 1; all these sections being seen from the right.

The crank gear has a crank $b^6$ (Figures 1 and 6) which is mounted on the shaft $B^4$ and is connected by a rod $d^1$ to a crank $d^2$ mounted on a short shaft D. The shaft D which is mounted in the casing $A^1$ is positively connected by gear wheels $d^3$, $d^4$, to the actuating shaft $D^5$ and makes one revolution each time the cash register is operated. When the driver disc $b^5$ moves upwards its nose $b^7$ (see Fig. 2) catches against the setting bolt $b^2$ and carries the sector $B^1$ with it, until by the feeler $b^3$ striking against the tail of the depressed key B the setting bolt $b^2$ is brought out of engagement with the nose $b^7$ of the disc $b^5$ and into engagement with a series of teeth $a^2$ of the keybank thereby locking the sector $B^1$. When the driver disc $b^5$ moves downwards a pin $b^8$ mounted thereon strikes against the sector $B^1$ and moves it back into the zero position.

Figure 5:
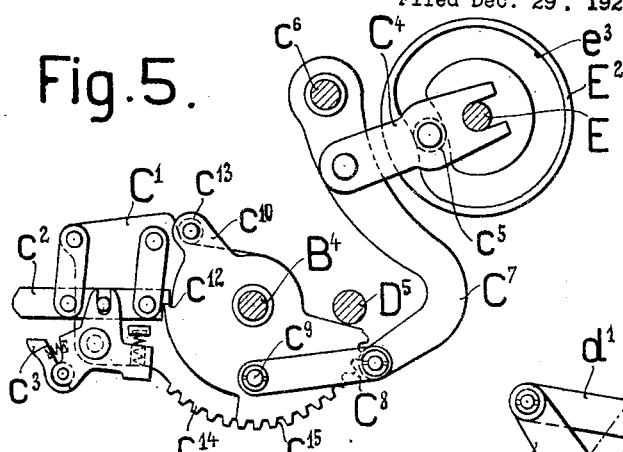
Fig. 5 is a view corresponding to Fig. 4 with some of the parts in a different position.

The gear wheel $d^3$ gears into a gear wheel $e^1$ of the same size (see Figures 1 and 6) which is mounted on a shaft E which carries a disc $E^2$ having a cam groove $e^3$ (see Figures 4 and 5). Since, as above stated, the gear wheel $d^3$ makes one revolution each time the cash register is operated, the disc $E^2$ will also make one revolution each time the cash register is operated. A roller $c^5$ mounted on a connecting rod $C^4$ engages in the cam groove $e^3$. The connecting rod $C^4$ is guided by one, fork-shaped end on the shaft E and at the other end it is pivoted to a rock lever $C^7$ mounted on a shaft $c^6$. The free end of the lever $C^7$ is pivotally connected to a rod $C^8$, which is pivotally connected by a bolt $c^9$ to a driver disc $c^{10}$ mounted to rotate on the shaft $B^4$ and provided for the driving sector $C^1$ which is likewise mounted to rotate on the said shaft $B^4$.

By means of the above described gearing an oscillating movement is imparted to the driver disc $c^{10}$ each time the cash register is operated, and the cam groove $e^3$ is so formed that the complete oscillatory movement (upwards and downwards) of the special key driver disc $c^{10}$ takes place during the downward movement of the amount key driver discs $b^5$, said first-named complete movement of the driver disc $c^{10}$, consequently, being completed prior to the counting movement of the amount key driving sector, which movement takes place on the upward oscillation.

When the driver disc $c^{10}$ swings upwards, its nose $c^{12}$ catches against the setting bolt $c^2$ and carries the sector $C^1$ with it, until the feeler $c^3$ strikes against the tail of a depressed special key. When the driver disc $c^{10}$ moves downwards a pin $c^{13}$ mounted on it strikes against the sector $C^1$ and brings it back into the zero position.

Into the teeth $b^9$ (see Fig. 2) of each sector $B^1$ gears a wheel $b^{11}$ rotating on a shaft $b^{10}$ (see Fig. 1) and adapted to be coupled by a rocking gear wheel $b^{13}$ to a gear wheel $b^{12}$ of the same size rotating on the shaft $b^{10}$ (see Figures 1 and 2). Each gear wheel $b^{12}$ gears into a wheel $f^1$. The gear wheels $f^1$ are mounted on the ends of hollow shafts F located within each other and enclosing a shaft G carried in the casing $A^1$ and projecting into the drum $G^1$ the latter being rigidly connected to the shaft G.

Inside the drum $G^1$ and on the end of each hollow shaft F is mounted a toothed counting disc $f^2$. The totalizing counters $h^1$ which are mounted in frames H can be brought into engagement with the counting discs $f^2$. The frames H for the totalizing counters, are mounted to rock, by means of bolts $h^2$, in the end walls $g^2$ of the drum $G^1$. On each frame H is mounted a roller $h^3$. By the cooperation of the rollers $h^3$ with the arrangement hereinafter described the oscillating motion required to throw the totalizing counters into or out of operation is imparted to the frames H.

Into the teeth $c^{14}$ of the sector $C^1$ gears an intermediate wheel $i^1$ (see Fig. 1) which rotates on the shaft $b^{10}$ (see Fig. 4) and gears into a gear wheel $i^2$. This gear wheel is mounted on one end of a hollow shaft $i^3$ surrounding the outermost hollow shaft F, the other end of said shaft $i^3$ carrying a slotted disc J. In a corresponding manner, a cam groove disc K is positively connected to the driver disc $c^{10}$ by an intermediate wheel $k^1$ rotating on the shaft $b^{10}$ and engaging a series of teeth $c^{15}$ on the disc $c^{10}$, also by a gear wheel $k^2$ cooperating with the wheel $k^1$ and a hollow shaft $k^3$ surrounding the hollow shaft $i^3$.

Figure 7:
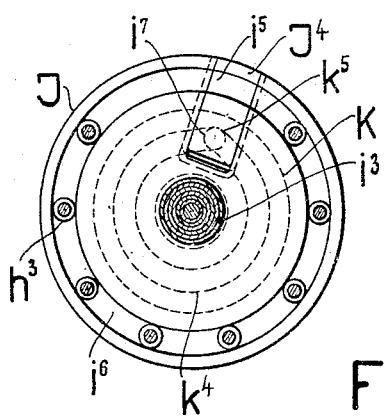
Fig. 7 shows the apparatus for throwing the totalizing counters into and out of the zero position and Fig. 8 shows the same apparatus with the totalizing counter thrown into operation.
Figure 8:
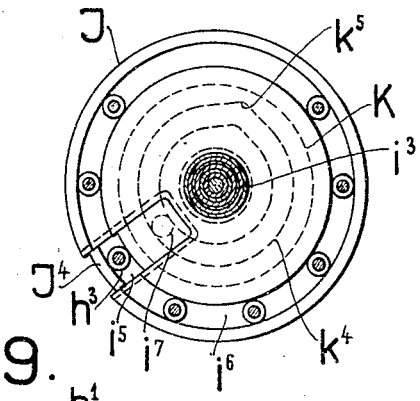

A sliding block $J^4$ (see particularly Figures 7 and 8) is movable radially on the slotted disc J. The sliding block $J^4$ is provided with a segment-shaped groove $i^5$ which runs through it and completes an annular groove $i^6$ leading from both sides up to the sliding block and concentric with the hollow shaft $i^3$ into a closed ring which runs across the sliding block $J^4$ when this latter is in its extreme outer position (see Fig. 7). In this annular groove engage the setting pins (rollers $h^3$) of the totalizing counter carriers H, so that by rotating the disc J the sliding block $J^4$ can be set either to the roller $h^3$ of a totalizing counter carrier or to the idle position (see Fig. 7).

The movement of the sliding block $J^4$ is effected by means of the portion $k^5$ of a cam groove $k^4$ $k^5$ provided in the disc K and in which a roller $i^7$ mounted on the sliding block $J^4$ engages. The portion $k^4$ of the groove $k^4$ $k^5$ runs concentric with the axis of the hollow shaft $k^3$. As long as the roller $i^7$ of the sliding block $J^4$ is in engagement with the portion $k^4$ of the groove, the sliding block $J^4$ is in its inner position. During this time, the totalizing counter, the setting roller $h^3$ of which engages in the groove $i^5$ of the sliding block, is coupled to the counting discs $f^2$. If, on the rotation of the disc K, the roller $i^7$ is moved into the portion $k^5$ of the groove $k^4$ $k^5$ the sliding block $J^4$ is moved radially and the totalizing counter carrier H rocked about the axis of the bolts $h^2$.

The action of the above described arrangement is as follows:—

By depressing amount keys B, the setting of the corresponding counting discs $f^2$ is prepared and by depressing one of the special keys C the setting of the corresponding totalizing counter $h^1$. When the cash register is operated firstly the driving sectors $B^1$ for the amount keys are brought back by the driver discs $b^5$ out of the position still assumed by them owing to the previous operation of the cash register, into the zero position, the coupling gear wheels $b^{13}$ being out of engagement, so that the counting discs $f^2$ are not connected to the sectors $B^1$. These latter are then carried upwards by the driver discs $b^5$ until they strike against the depressed keys. The counting movement of the sectors $B^1$ which is limited by this striking is transferred to the counting discs $f^2$ which are positively connected to the sectors $B^1$, after the coupling wheels $b^{13}$ have been thrown into operation, and to the totalizing counter $h^1$ in engagement with the counting discs $f^2$.

When no special key C for one of the totalizing counters is depressed the sector $C^1$ is moved by the driver disc $c^{10}$ up to the uppermost position, in the cash register shown (see Fig. 4) up to the tenth place. In all other respects the action of the driver disc $c^{10}$ and of the sector $C^1$, which forms the setting member of the cash register serving to select the totalizing counter, is the same as that of the driver disc $b^5$ and the sectors $B^1$ of the mechanism for setting the amount. The adjustment is, however, effected by the operation of the cam $E^2$ so much more rapidly that the complete to and fro-movement of the driver discs $c^{10}$ (downwards and upwards) has already been ended when the discs $b^5$ and the sectors $B^1$ have arrived in the zero position (below).

When the driver disc $c^{10}$ moves downwards the cam groove $k^4$ of the disc J positively connected to the driver disc $c^{10}$ moves the sliding block $J^4$ out of the inner position still assumed by it owing to the previous operation of the cash register, so that any roller $h^3$, of a carrier H, just in engagement with the groove $i^5$ of the sliding block $J^4$ is moved back into the path of the annular groove $i^6$ of the slotted disc J and the particular totalizing counter brought out of engagement with the counting discs $f^2$. If the sliding block $J^4$ had been set to the idle position, this reversal of the sliding block takes place during a rotation of the disc K, which corresponds to the rearward movement of the sector $C^1$ and of the driver disc $c^{10}$, from the tenth to the ninth position, and if the sliding block $J^4$ had been set to one of the rollers $h^3$, this reversal of the sliding block takes place in each case, correspondingly, before the point of the groove portion $k^5$ coincides with the radial centre line of the sliding block $J^4$.

Now when all the rollers $h^3$ of the carriers H have been brought into the path of the annular groove $i^6$ of the disc J the rearward rotation of the disc J can take place, which is effected by the contact of the pin $c^{13}$ with the sector $C^1$ positively connected to the disc J. After the sector $C^1$ and the driver disc $c^{10}$ have been returned to the lowest position (see Fig. 5) the disc $c^{10}$ is again moved upwards by the reversal of the thrust crank gear, the setting bolt $c^2$ of the sector $C^1$ being carried along by the nose $c^{12}$ of the disc $c^{10}$ until it strikes against the key, and thereby being released from the driver disc $C^{10}$ and locked. By this adjustment of the sector $C^1$ and of the slotted disc J positively connected to it, the sliding block $J^4$ is set to the totalizing counter carrier corresponding to the depressed special key, after which the cam disc K which has been moved on to the tenth place moves the sliding block $J^4$ inwards by means of the groove portion $k^5$ and the roller $i^7$, and throws the selected totalizing counter $h^1$ into gear with the teeth of the counting discs $f^2$. Now by coupling the gear wheels $b^{11}$, $b^{12}$ the positive connection of the amount key sectors with the corresponding counting discs $f^2$ is effected which sectors have been moved downwards in the meantime, these sectors then being set by the upward movement of the driver disc $b^5$. When this takes place, the counting movements imparted to the sectors $B^1$ are transferred, by means of the counting discs $f^2$ to the particular totalizing counter $h^1$ which has been thrown into operation. After the counting movement has terminated the gear wheels $b^{11}$, $b^{12}$ are disconnected and then the tens transfers (prepared by running past the ninth figure of the totalizing counter carriers) to the counting wheels of the next higher order are effected in a suitable manner (not shown in the drawing).

In addition to being used for cash registers of the kind described, the new apparatus can also be used for such constructions in which the totalizing counters are arranged in a circle round setting discs and are arranged to be directly brought into engagement therewith. The apparatus can also be used for throwing into action totalizing counters which are arranged along racks acting as setting members or operated by setting members of the machine. In such a case the groove of the slide block carrier would have to be in the form of a straight line and the cam groove in which the setting pin of the sliding block engages, would have to run, to a partial extent, parallel therewith.

Claims.

1. In a machine of the class described a plurality of registering mechanisms, a set of operating members common to said registering mechanisms, a gearing member, means carried by said registering mechanisms and engaged by said gearing member whereby said gearing member may be selectively coupled to one of said registering mechanisms, said gearing member comprising further a displaceable block for moving the selected registering mechanism into engagement with said set of operating members.

2. In a machine of the class described a plurality of registering mechanisms, a set of operating members common to said registering mechanisms, a setting pin carried by each registering mechanism and a setting gear comprising a grooved block carrier, a radially shiftable block mounted on said block carrier, said sliding block being formed with a groove which coincides with the groove of said carrier and a cam and pin means for radially moving said sliding block whereby the setting pin of a selected registering mechanism may be engaged for moving said registering mechanism into engagement with said set of operating members.

3. In a machine of the class described, a plurality of registering mechanisms, a set of operating mechanisms common to said registering mechanisms, driver discs forming a part of the setting mechanism for the amount keys, a special key driver disc, a gearing member engaging said registering mechanisms for selecting and moving said selected registering mechanism into engagement with said set of operating members and means connecting said special key driver disc to said amount key driver discs whereby said special key driver disc completes one operation during the first half of the operation of said amount key driver disc.

4. In a machine of the class described, a plurality of registering mechanisms, a set of operating mechanisms common to said registering mechanisms, driver discs forming a part of the setting mechanism for the amount keys, a special key driver disc, a gearing member engaging said registering mechanisms for selecting and moving said selected registering mechanism into engagement with said set of operating members, means positively connecting said gearing member to said special key driver disc and means connecting said special key driver disc to said amount key driver discs whereby said special key driver disc completes one operation during the first half of the operation of said amount key driver disc.

The foregoing specification signed at Essen, Germany, this 29th day of November, 1921.

ERNST BREITLING.